United States Patent
Geissler et al.

(10) Patent No.: US 8,526,453 B2
(45) Date of Patent: Sep. 3, 2013

(54) LINECARD AND METHOD FOR TELECOMMUNICATION

(75) Inventors: Friedrich Geissler, Wolfratshausen (DE); Christian Mandl, Salzburg (AT); Stephan Pruecklmayer, Hoehenkirchen-Siegertsbrunn (DE)

(73) Assignee: Lantiq Deutschland GmbH, Neubiberg (DE)

( * ) Notice: Subject to any disclaimer, the term of this patent is extended or adjusted under 35 U.S.C. 154(b) by 976 days.

(21) Appl. No.: 11/752,639

(22) Filed: May 23, 2007

(65) Prior Publication Data
US 2007/0274333 A1    Nov. 29, 2007

(30) Foreign Application Priority Data
May 23, 2006 (DE) .......... 10 2006 024 201

(51) Int. Cl.
*H04L 12/28* (2006.01)

(52) U.S. Cl.
USPC ........ 370/419; 370/357; 370/359; 379/93.01; 379/219; 379/399.01; 709/238; 711/130

(58) Field of Classification Search
None
See application file for complete search history.

(56) References Cited

U.S. PATENT DOCUMENTS

| | | | |
|---|---|---|---|
| 6,104,721 A * | 8/2000 | Hsu | 370/431 |
| 6,263,016 B1 * | 7/2001 | Bellenger et al. | 375/222 |
| 6,320,867 B1 | 11/2001 | Bellenger et al. | |
| 6,522,638 B1 * | 2/2003 | Haugli et al. | 370/329 |
| 6,640,239 B1 * | 10/2003 | Gidwani | 709/203 |
| 6,937,616 B1 * | 8/2005 | Rezvani et al. | 370/466 |
| 7,116,707 B1 * | 10/2006 | Armistead | 375/222 |
| 2002/0061012 A1 * | 5/2002 | Thi et al. | 370/352 |
| 2002/0093966 A1 * | 7/2002 | Liva et al. | 370/400 |
| 2004/0042510 A1 * | 3/2004 | Bremer et al. | 370/539 |

FOREIGN PATENT DOCUMENTS
WO    WO 03/081942    * 10/2003
WO    WO 03/081942 A1 * 10/2003

OTHER PUBLICATIONS

Fugger, Paul, et al., "A Highly Flexible, Module-based SoC-Approach for VoIP-Applications," Proceedings of the 28th European Solid-State Circuits Conference, 2002, pp. 331-334, ESSCIRC.

"VINETIC Voice and Internet Enhanced Telephony Interface Concept: PEB 3324 Version 1.1, PEB 3314 Version 1.1, PEB 3318 Version 1.1, PEB 4264/-2 Version 1.2, PEB 4364 Version 1.2, PEB 4265/-2 Version 1.1, PEB 4365 Version 1.1, PEB 4266 Version 1.1," Preliminary Product Overview, DS1, Jul. 2001, pp. 1-41, Infineon Technologies AG, Germany.

* cited by examiner

*Primary Examiner* — Ayaz Sheikh
*Assistant Examiner* — Nicholas Sloms
(74) *Attorney, Agent, or Firm* — Slater & Matsil, L.L.P.

(57) ABSTRACT

Linecards and methods for processing signals are provided.

27 Claims, 2 Drawing Sheets

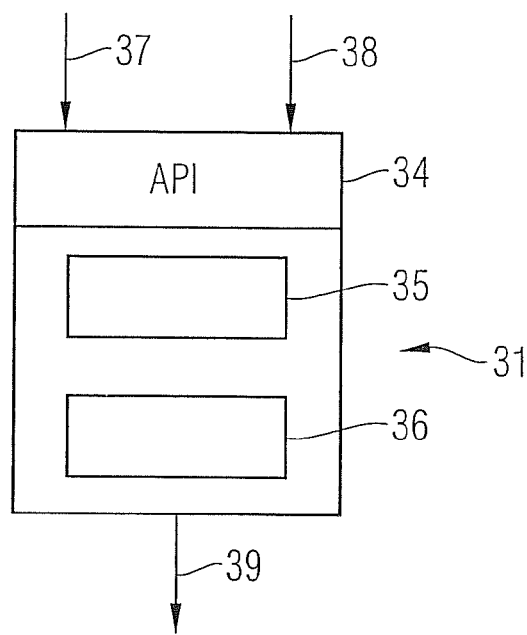

LINECARD AND METHOD FOR TELECOMMUNICATION

This application claims priority to German Patent Application 10 2006 024 201.7, which was filed May 23, 2006, and is incorporated herein by reference.

BACKGROUND

The present invention relates to telecommunication.

BRIEF DESCRIPTION OF THE DRAWINGS

Hereinafter, exemplary embodiments of the invention will be described with reference to the drawings.

FIG. 2 is a block diagram of a control unit of a linecard of FIG. 1.

DETAILED DESCRIPTION OF ILLUSTRATIVE EMBODIMENTS

Figure 1:
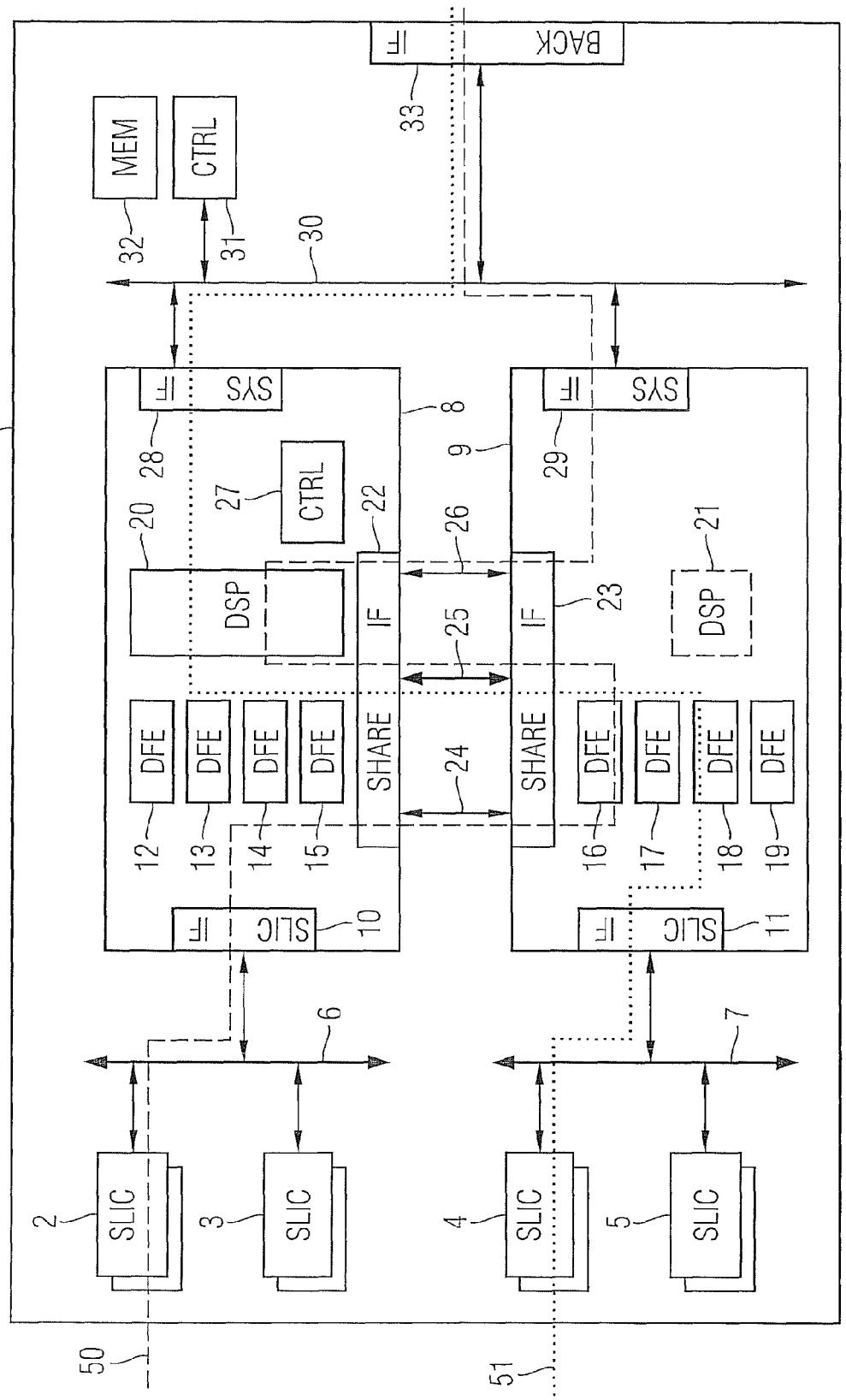
FIG. 1 is a linecard according to an embodiment.

In the following, exemplary embodiments of the present invention will be described in detail. It is understood that the following description is given only for the purpose of illustrating the principles of the invention and is not to be taken in a limiting sense. Rather, the scope of the invention is defined only by the appended claims and is not intended to be limited by the exemplary embodiments described hereinafter.

It is also understood that in the following description of exemplary embodiments, any direct connection or coupling between functional blocks, devices, components or other physical or functional units shown in the drawings or described herein could also be implemented by an indirect connection or coupling. In particular, it should be appreciated that any data connection between functional devices or units may be implemented as a physical link such as a wire or line or as a wireless connection.

It is understood that the features of the various exemplary embodiments described herein may be combined with each other unless specifically noted otherwise.

In FIG. 1, a linecard according to an embodiment of the present invention is shown. The linecard depicted in FIG. 1 is a linecard for POTS (Plain Old Telephone Service) services. It is to be understood that the present invention is not limited to POTS linecards and in other embodiments linecards for other types of communication, for example, DSL (Digital Subscriber Line) linecards are provided.

The linecard 1 shown in FIG. 1 comprises a plurality of subscriber line interface circuits (SLIC) 2, 3, 4, 5, wherein the four SLICs represented are representative for a generally arbitrary number of SLICs which are present on linecard 1. SLICs serve to connect subscriber lines with a linecard, and their number is generally determined by how many subscriber lines are to be connected with linecard 1.

In an embodiment, the SLICs are designed such that they perform a level shifting of a signal provided by the subscriber line, preprocess the signal and provide a corresponding analog output signal.

SLICs 2, 3 are connected via a connection 6 with a SLIC interface 10 of a first signal processing unit 8. Correspondingly, SLICs 4, 5 are connected via a connection 7 with a SLIC interface 11 of a second signal processing unit 9.

First signal processing unit 8 comprises a plurality of digital frontends 12-15. In the embodiment shown, these digital frontends comprise an analog to digital converter for digitizing the analog output signals provided by SLICs 2, 3 and digital filters for filtering the digital data received via SLICs 2 and 3 and SLIC interface 10. In an embodiment, the digital filtering is programmable or adaptable using parameters, such that different signals may be filtered according to a respective standard or communication type, for example, conventional telephone signals, Voice-Over-IP signals and the like. The necessary filter parameters may, e.g., be derived from the respective standard for the transmission.

Furthermore, in the embodiment shown in digital frontends 12-15, a compounding of data is performed. Compounding, according to the conventional meaning of the word in the art, refers to a non-linear quantization, wherein signals having a large amplitude are quantized with comparatively coarse levels, whereas signals with lower amplitude or weaker signals are quantized using finer levels. In such an embodiment, a signal to noise ratio may be kept sufficiently large without needing too many quantization levels, which would increase the amount of data and therefore would decrease the bit rate. However, in other embodiments no compounding is performed.

It is to be noted that for clarity's sake, the connections between the various components of the first signal processing unit 8, for example, connections between SLIC interface 10 and digital frontends 12-15, are not shown in FIG. 1.

It is to be noted that in other embodiments, the analog to digital converter mentioned above may be integrated in SLIC interface 10 or in SLICs 2, 3 or may also be provided as a separate signal processing block. Furthermore, the first signal processing unit 8 comprises a digital signal processor 20 which, for example, serves for processing and coding of Voice-Over-IP data or for data compression. In embodiments of the present invention, digital signal processor 20 may be a processor adapted specifically for signal processing, a correspondingly programmed standard processor, for example, a RISC-processor ("reduced instruction set computer") or a combination of these possibilities.

First signal processing unit 8 is connected via a system interface 28 with a bus 30, which may, for example, be an Ethernet bus, to output data processed in signal processing unit 8. This data, for example, may be packet-based data according for example to the IP protocol.

In the embodiment shown, data received by SLIC interface 10 may be processed by one of digital frontends 12-15 followed by digital signal processor 20, to be then output via system interface 28.

Furthermore, first signal processing unit 8 comprises an internal control device 27, which will be explained later.

First signal processing unit 8 comprises a share interface 22, which in the embodiment shown comprises three sub-interfaces as indicated by arrows 24-26. Via a first sub-interface corresponding to arrow 24, data received via SLIC interface 10 may be output to the outside of first signal processing unit 8 instead of feeding it to one of digital frontends 12-15. Likewise, via the first sub-interface, data may be fed from outside to one of digital frontends 12-15. This first sub-interface 24 may be designed as a serial digital interface, with which uncompounded data may be transmitted as well. An example for a digital serial interface is a USB interface (Universal Serial Bus).

A second sub-interface corresponding to arrow 25 of share interface 22 makes it possible to output data from digital frontends 12-15 to the outside and to receive data for feeding the data to digital signal processor 20.

The second sub-interface of first share interface 22 may, for example, operate with a pulse code modulation (PCM) method, for which the compounded data output by digital frontends 12-15 is suitable. In this method, data is transmitted in a plurality of time slots, for example, 128 time slots, i.e., it is a time division multiplex technique. In embodiments for increasing the capacity of a transmission a plurality, i.e., at least two, time slots may be combined in order to obtain a higher transmission rate. In embodiments, by combining a sufficiently large number of time slots, it is possible to transmit uncompounded data as well.

Via a third sub-interface of share interface 22 corresponding to arrow 26, it is possible to output a signal output by a digital signal processor 20 and/or to feed a signal to first signal processing unit 8 to be output via a system interface 28.

In an embodiment, the third sub-interface 26 of share interface 22 is an Ethernet interface, which is adapted to handle the packet-based data output by digital signal processor 20 in this embodiment.

In other embodiments, interfaces other than the ones given below may be also used.

The use of share interface 22 will be explained later in an exemplary manner.

Second signal processing unit 9 is designed similar to first signal processing unit 8, and the corresponding parts of the above description of signal processing unit 8 also apply to signal processing unit 9. In the embodiment, second signal processing unit 9 comprises a SLIC interface 11 corresponding to SLIC interface 10 and digital frontends 16-19 corresponding to digital frontends 12-15. Via a connection 7, data from SLICs 4 and 5 are fed to SLIC interface 11 of second signal processing unit 9. Furthermore, second signal processing unit 9 comprises a system interface 29 for connection with bus 30.

In contrast to first signal processing unit 8, second signal processing unit 9 in an embodiment does not comprise a digital signal processor. In another embodiment, a digital signal processor 21 having less processing power than digital signal processor 20 of first signal processing unit 8 is provided. Digital signal processor 21, for example, may provide simple functions like a tax metering pulse. Furthermore, in the embodiment shown, second signal processing unit 9 does not comprise an internal control unit.

Similar to first signal processing unit 8, also second signal processing unit 9 comprises a share interface 23 comprising three sub-interfaces corresponding to arrows 24, 25 and 26. First signal processing unit 8 and second signal processing unit 9 may communicate and exchange data via share interfaces 22 and 23.

In embodiments, the number of digital frontends 12-19 in signal processing units 8 and 9 may be less than the number of SLICs 2-5. In this case, it is assumed that at a certain point in time, not all subscriber lines connected with SLICs 2-5 are active. In different embodiments, the number of frontends 12-19 may be greater or equal than the number of SLICs 2-5 such that all subscriber lines connected to SLICs 2-5 may be active.

Linecard 1 of the embodiment of FIG. 1 furthermore comprises a backplane interface 33, with which data processed on linecard 1 is output for further processing. Furthermore, an external control unit 31 with an associated memory 32 is provided on linecard 1.

It is to be noted that the linecard shown with a first signal processing unit 8 and a second signal processing unit 9 is only to be taken as an example. In other embodiments, a linecard comprises more first and second signal processing units. As will be described in the following with first signal processing unit 8 and second signal processing unit 9, which optionally may comprise a digital signal processor 21 with reduced computing power, a linecard according to an embodiment may be adapted to requirements of a respective application.

The basic operation of linecard 1 will be described in the following.

In the embodiment of FIG. 1, for example, it is possible to receive a signal via SLIC 3, feed it to first signal unit processing unit 8 via SLIC interface 10, process it in one of the digital frontends, for example, in digital frontend 12, and in digital signal processor 20 and output the processed data via system interface 28. A similar processing is possible in second signal processing unit 9 for data, the processing of which does not require a digital signal processor or for the processing of which digital signal processor 21 is sufficient.

Via share interfaces 22 and 23, additional possibilities for data processing are provided. For example, it is possible, as indicated by dashed line 50, to feed data via SLIC 2 and SLIC interface 10 to first signal processing unit 8. In case, for example, all digital frontends 12-15 are occupied, i.e., their processing capability is used for other purposes, for example, for other subscriber lines and that, on the other hand, in second signal processing unit 9, a digital frontend is available, it is possible to feed the data via share interfaces 22 and 23 corresponding to arrow 24, i.e., via the respective first sub-interfaces, for example, to digital frontend 16 of second signal processing unit 9.

In case the respective data are data for which extensive digital signal processing is required, data processed in digital frontend 16 may then be fed to digital signal processor 20 of first signal processing unit 8 corresponding to arrow 25 via the second sub-interfaces of share interfaces 22 and 23. If, for example, then it is determined that system interface 28 is already working at full capacity, the data may be forwarded via the third sub interfaces of share interfaces 22 and 23 corresponding to arrow 26 to system interface 29 of second signal processing unit 9 and output via backplane interface 33 from there.

In another example according to dotted line 51, data is fed via SLIC 4 and SLIC interface 11 to second signal processing unit 9 and processed there in digital frontend 18. In case the data is data needing an extensive signal processing, for example, Voice-Over-IP data, in the embodiment the data may then be fed via the second sub-interfaces of share interfaces 22 and 23 corresponding to arrow 25 to digital signal processor 20. In this example the data is then not returned to second signal processing unit 9, but is output via system interface 28 of first signal processing unit 8 to bus 30 and then forwarded via backplane interface 33 to further units or circuits.

As these two exemplary signal processing paths as represented by lines 50 and 51 show, using share interfaces 22 and 23 it is possible to mutually use resources like digital frontends and signal processors of first signal processing unit 8 and second signal processing unit 9 such that first signal processing unit 8 and second signal processing unit 9 may be basically operated as a single processing unit.

As already mentioned, linecards according to embodiments may comprise more signal processing units than first signal processing unit 8 and second signal processing unit 9. With the concept using share interfaces according to this embodiment, it is possible to produce linecards for various applications using only a small number of different components.

For example, in an embodiment, for linecards that are intended to be used in central offices in which only a small amount of data needing extensive processing is received, one signal processing unit corresponding to first signal processing unit 8 and four signal processing units corresponding to second signal processing unit 9 are provided. In another embodiment, on a linecard, at which a large amount of data needs extensive processing is received, for example, three signal processing units corresponding to first signal processing unit 8 and two signal processing units corresponding to second signal processing unit 9 may be provided. Therefore, overall a higher capacity for digital signal processing is provided via the respective digital signal processors 20, wherein in both embodiments only two types of signal processing units are necessary.

If regularly, data is received for which a small amount of digital signal processing is necessary, the optional digital signal processor with reduced processing power 21 may be provided on some or all of the signal processing units corresponding to second digital signal processing unit 9.

The above configuration serves only as example, and in embodiments any number of signal processing units corresponding to first signal processing unit 8 and signal processing units corresponding to second signal processing unit 9, with or without digital signal processor 21, may be provided.

First signal processing unit 8 and second signal processing unit 9 in an embodiment each are designed as a single chip or integrated circuit and therefore form a single device. In such an embodiment, for a plurality of different linecards having different signal processing capabilities only two or three (with optional digital signal processor 21) different chips have to be provided. In other embodiments, first signal processing unit 8 and second signal processing unit 9 each are formed by a group of chips belonging together.

It should be noted that the above embodiments serve only as an example, and in other embodiments, different numbers of first signal processing units 8, second signal processing units 9 having different components in different numbers the one shown in the above embodiment may be provided.

In another embodiment, third sub-interface 26 of share interfaces 22 and 23 may be directly connected with bus 30 to provide an additional possibility for outputting data.

In the following, the control of share interfaces 22 and 23 according to an embodiment will be explained. The control is performed by external control unit 31 with its associated memory 32 and internal control unit 27 of the embodiment of FIG. 1. The structure of external control unit 31 according to an embodiment is schematically shown in FIG. 2.

External control unit 31 may be accessed via backplane interface 33. For example, control commands may be sent to external control unit 31 from an apparatus in which the linecard is integrated. External control unit 31 to this end provides an application programmable interface (API) 34. This interface 34 in the embodiment shown provides a uniform interface independent from the internal structure of the linecard comprising first signal processing unit 8 and second signal processing unit 9. In the embodiment, the apparatus into which linecard 1 is integrated or any other controlling instance does not need to know the exact structure of linecard 1. Merely necessary information for receiving data is, as indicated by arrows 37 and 38, fed to interface 34. This information according to an embodiment comprises information of which type of data is received via which SLIC and on which logic port the received data are to be output on backplane interface 33. In embodiments, additionally further information, for example, regarding a required compression may be transmitted.

External control unit 31 further comprises a state machine 35 and a resource manager 36, to provide the requested signal path. Resource manager 36 to this end is configured to store the currently present signal paths and the use of the individual resources like digital frontends 12-19 or digital signal processor 20 in memory 32. Signal path, in this respect, refers to a path from a SLIC to backplane interface 33 via which data is processed. For example, lines 50 and 51 mark such signal paths.

When a new request for processing a signal incoming at one of the SLICs is received state machine 35 determines, using information of resource manager 36 regarding free resources, over which the signal path this signal is to be processed and communicates this as indicated by an arrow 39 via system interface 28 to internal control device 27. Internal control device 27 then controls the corresponding connection of resources in first signal processing unit 8 and second signal processing unit 9 including the corresponding connections via share interfaces 22 and 23. The control of the connections in the second signal processing unit 9 in the embodiment shown is then also performed via share interfaces 22 and 23. In a different embodiment, also second signal processing unit 9 comprises an internal control device 27. In yet another embodiment, no internal control device 27 is provided, and the connections are controlled directly via system interfaces 28 and 29 by external control unit 31.

In an embodiment, the capacity of share interfaces 22 and 23 is greater than the maximum needed capacity. In such an embodiment, the requirements of optimization of using the resources are relaxed.

Resource manager 36 and state machine 35 in an embodiment additionally may decide for all or some connections according to which standard or which connection type a connection is established. For example, certain connection types, like connections according to the G.729 standard, are subject to license fees, such that only a certain number of connections of this type may be used simultaneously. In case this number is already reached, resource manager 36 and state machine 35 in an embodiment may decide that further connections are established according to standard G.711.

External control unit 31 in other embodiments may be designed different from FIG. 2. For example, the functionalities of state machine 35 and resource manager 36 may be combined. In other embodiments, no programmable application interface 34 is provided, and it is decided externally, for example, by circuitry in an apparatus where linecard 1 is integrated, over which signal path signal processing is to be performed. It is to be noted that the linecard shown and described above is merely an exemplary embodiment of the present invention. In other embodiments, the number of SLICs, digital frontends and digital signal processors in each signal processing unit may vary, and other components may additionally be present. Furthermore, external control unit 31 and memory 32 may be provided externally of the linecards. In other embodiments, instead of the shown bidirectional sub-interfaces separate sub-interfaces may be provided for outputting and receiving data via share interfaces in the signal processing units. Furthermore, while the shown embodiment represents a linecard for POTS signals, linecards according to other embodiments are adapted to other kinds of telecommunication signals, for example, DSL signals. In this case, like in the embodiment described above, signal processing units are provided which may communicate via share interfaces and therefore enable a flexible arrangement of the respective linecard.

What is claimed is:

1. A central unit for processing telecommunication signals, comprising:
   a plurality of interface circuits that are capable to connect subscribers lines with said central unit;
   a first signal processing unit on board the central unit including at least the following component:

a first digital signal processor that digitally processes the telecommunication signals;
a second signal processing unit on board the central unit that shares common functionalities with the first signal processing unit to process the telecommunication signals, wherein the second signal processing unit includes a smaller subset of components included in the first signal processing unit;
an interface coupling the first and second signal processing units; and
a control unit for coordinating use of the common functionalities from amongst the first and second signal processing units through the interface that couples the first and second signal processing units on board the central unit,
wherein the control unit causes a portion of the functionalities of the first signal processing unit and functionalities of the second signal processing unit to be utilized such that the first and second signal processing units are operated effectively as a single processing unit,
wherein a digital front end function of the second signal processing unit is routed to an output of a first line interface via the first signal processing unit; and
the first digital signal processor of the first signal processing unit is routed to an output of the digital front end function of the second signal processing unit.

2. The central unit of claim 1, wherein the interface comprises a plurality of sub-interfaces.

3. The central unit of claim 2, wherein the sub-interfaces include a digital serial interface.

4. The central unit of claim 2, wherein the sub-interfaces include a pulse code modulation interface.

5. The central unit of claim 2, wherein the sub-interfaces include an Ethernet interface.

6. The central unit of claim 1, wherein the second signal processing unit is controlled by the control unit as a tax metering pulse processor.

7. The central unit of claim 1, wherein the control unit is external to the central unit.

8. The central unit of claim 1, further comprising a resource manager that stores the components of the first and second signal processing units that are to be used.

9. The central unit of claim 1, wherein the central unit is a DSL linecard.

10. The central unit of claim 1, wherein the subset comprises at least two different components.

11. The central unit of claim 1, wherein the subset comprises a subscriber line interface circuit.

12. The central unit of claim 1, wherein the subset comprises a digital front end.

13. The central unit of claim 1 wherein the central unit is a linecard.

14. The central unit of claim 1 wherein the first and second processing units are digital front end units.

15. The central unit of claim 1, wherein the second signal processing unit shares common functionalities with the first signal processing unit with respect to a single line interface.

16. The central unit of claim 1, wherein the common functionalities comprise digital frontend functionality.

17. The central unit of claim 1, wherein the common functionalities comprise digital signal processing resources.

18. The central unit of claim 1, wherein:
an input to the digital front end function of the second signal processing unit is coupled to the first signal processing unit via a share interface; and
the output of the digital front end function of the second signal processing unit is coupled to the first digital signal processor of the first signal processing unit via the share interface.

19. The central unit of claim 1 wherein:
the first signal processing unit provides Voice-over-IP (VoIP) functionalities and the second signal processing unit provides POTS functionalities; or
the first signal processing unit provides POTS functionalities and the second signal processing unit provides VoIP functionalities.

20. The central unit of claim 1, wherein the interface comprises a plurality of sub-interfaces.

21. A method for processing telecommunication signals, the method comprising:
receiving a telecommunication signal at a central unit, the central unit comprising a first signal processing unit and a second signal processing unit, wherein the first signal processing unit comprises a first digital signal processor, and the second signal processing unit comprises a second digital signal processor,
wherein the first and second signal processing units provide common functionalities to process the telecommunication signals;
wherein the first digital signal processor has more processing power than the second digital signal processor;
determining if it is possible to process the telecommunication signal using only the first digital signal processor of the first signal processing unit or only the second digital signal processor of the second signal processing unit;
if it is possible to process the telecommunication signal using only the first digital signal processor of the first signal processing unit or only the second digital signal processor of the second signal processing unit, respectively determining a signal path that comprises either only one of the first digital signal processor or the second digital signal processor;
if it is not possible to process the telecommunication signal using only the first digital signal processor of the first signal processing unit or only the second digital signal processor of the second signal processing unit, determining a signal path that comprises the first digital signal processor and the second digital signal processor;
processing the telecommunication signal corresponding to the determined signal path;
coupling a digital front end function of the second digital processor to an output of a first line interface via the first digital signal processor; and
coupling a DSP function of the first digital signal processor to an output of the digital front end function of the second digital signal processor.

22. The method of claim 21 wherein the central unit is a line card.

23. The method of claim 21 wherein the first and second signal processing units are digital front end units.

24. The method of claim 21, wherein the first and second signal processing units provide common functionalities with respect to a single line interface.

25. The method of claim 21, wherein the common functionalities comprise digital frontend functionality.

26. The method of claim 21, wherein the common functionalities comprise digital signal processing resources.

27. The method of claim 21 wherein:
the first processing unit provides Voice-over-IP (VoIP) functionalities and the second processing unit provides POTS functionalities; or the second processing unit provides Voice-over-IP (VoIP) functionalities and the first processing unit provides POTS functionalities.

* * * * *